United States Patent [19]
Nishida et al.

[11] Patent Number: 5,570,384
[45] Date of Patent: Oct. 29, 1996

[54] LASER PROCESSING APPARATUS WITH BEAM MODE CONTROL

[75] Inventors: Satoshi Nishida; Masato Matsubara; Akihiro Otani, all of Aichi, Japan

[73] Assignee: Mitsubishi Denki Kabushiki Kaisha, Tokyo, Japan

[21] Appl. No.: 181,062

[22] Filed: Jan. 14, 1994

[30] Foreign Application Priority Data

Jan. 20, 1993 [JP] Japan .................................. 5-007821

[51] Int. Cl.⁶ .................................................. H01S 3/098
[52] U.S. Cl. .................................................. 372/19; 372/38
[58] Field of Search ........................................ 372/19, 38

[56] References Cited

U.S. PATENT DOCUMENTS

| | | | |
|---|---|---|---|
| 4,859,015 | 8/1989 | Krinsky et al. | 372/19 |
| 5,142,543 | 8/1992 | Wakabayashi et al. | 372/19 |

FOREIGN PATENT DOCUMENTS

| | | |
|---|---|---|
| 2174283 | 7/1990 | Japan . |
| 3221287 | 9/1991 | Japan . |

OTHER PUBLICATIONS

Hishii et al., "High performance compact 5kW CO₂ Laser for Industrial Use", *ICALEO* '87 (Nov. 1987), pp. 109–115.
"Laser Processing Technology", Nikkan Kogyo Shimbun, Ltd., p. 19. Published Jan. 28, 1985.
SPIE—"Laser Beam Diagnostics", The International Society for Optical Engineering, vol. 1414, (1991), pp. 21–32. Published Jan. 21–22, 1991.

*Primary Examiner*—Rodney B. Bovernick
*Assistant Examiner*—Robert E. Wise
*Attorney, Agent, or Firm*—Sughrue, Mion, Zinn, Macpeak & Seas

[57] ABSTRACT

A laser processing apparatus which makes it possible to select a laser beam mode always optimally suited to processing of a workpiece on the basis of a change in the focusing characteristic of each mode and the amount of movement of the beam's focal point with respect to a change in a laser output value. The laser processing apparatus includes a laser oscillator capable of changing the beam mode of its laser beam, and a processing table, all controlled by a controller which operates to change the beam mode of the oscillator in correspondence with a laser output during processing.

31 Claims, 15 Drawing Sheets

(PARTIAL REFLECTOR ABSORPTION INDEX: 0.2%
CONDENSER ABSORPTION INDEX: 0.3%
LASER OSCILLATOR ML3016F2)

(PARTIAL REFLECTOR ABSORPTION INDEX: 0.2%
FOR THE ML3016F2 LASER OSCILLATOR)

TEMPARATURE RISE/FALL CURVE OF
THE PARTIAL REFLECTOR OR CONDENSER

FIG. 20(a)   FIG. 20(b)   FIG. 20(c)
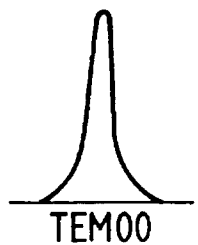
TEM00
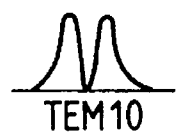
TEM10
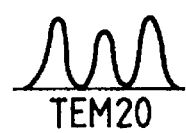
TEM20
FIG. 20(d)   FIG. 20(f)
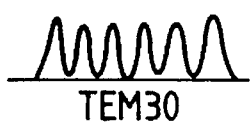
TEM30
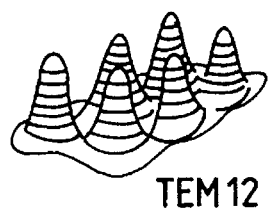
TEM12
FIG. 20(i)
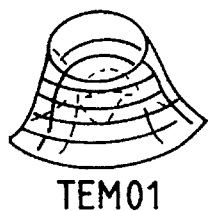
TEM01
VERTICAL AXIS: ENERGY DENSITY
HORIZONTAL AXIS: DISTANCE FROM LASER BEAM AXIS

LASER PROCESSING APPARATUS WITH BEAM MODE CONTROL

BACKGROUND OF THE INVENTION

1. Field of the Invention

The present invention relates to an improvement in processing efficiency and processing accuracy in a laser processing apparatus, especially a laser cutting apparatus.

2. Description of the Prior Art

In laser processing, especially laser cutting, a beam having a good focusing characteristic is required as a condition for performing high-accuracy processing. As a beam satisfying this condition, a beam of the TEM00 mode, whose focusing characteristic is theoretically the highest, has hitherto been used. On the other hand, however, the higher the order of the mode, the higher the output power that can be obtained, so that beam modes whose orders are higher than the zeroth order, e.g., TEM01*, have been used. The configurations of these beam modes are shown in, for instance, "Laser Processing Technology," page 19, published by The Nikkan Kogyo Shimbun, Ltd., and are reproduced herein in FIG. 20.

FIG. 19 is a schematic diagram illustrating an example of a conventional processing apparatus. In the drawing, reference numeral 1 denotes a laser oscillator; 2, a laser beam; 3, a processing head, such as a cutting head; 4, a condenser lens; 5, an X-Y table; 6, a controller; 7, a reflecting mirror; 8, a partial-reflection mirror (a beam-fetching window); 9, an output detection sensor; 10, a mode changeover unit; and 11, a workpiece.

Next, the operation of the apparatus will be described. The laser beam 2 emitted from the oscillator 1 is directed toward a location above the workpiece 11 by means of the reflecting mirror 7, and is focused on the workpiece 11 by means of the condenser lens 4. At this time, a processing assist gas is simultaneously injected through an opening at a lower end of the processing head 3 together with the laser beam 2. Here, the positional relationship between the focal point of the laser beam and the workpiece 11 (i.e., focal position), the assist gas pressure, and the nozzle height (the distance between a processing-head lower end and the workpiece) become important parameters at the time of processing. In addition, stored in a storage unit of the controller 6 are a plurality of processing conditions, such as the focal position, the processing gas pressure, the nozzle height, the laser output, the form of laser oscillation output (continuous wave or pulse wave), the pulse frequency, and the pulse duty cycle. Optimum conditions are selected in accordance with the material of the workpiece 11, plate thickness, processing (cutting) speed, and a processing (cutting) profile. The oscillator 1, the processing head 3, the X-Y table 5, and the like are controlled on the basis of these conditions. In addition, the beam mode of the laser beam 2 is changed by the mode changeover unit 10.

In the laser processing apparatus arranged in the above-described manner, if the output is increased in processing in the TEM00 mode, which gives a good focusing characteristic, defective processing and unstable processing are observed. To cite an example, in a case where piercing (causing the beam to pierce the workpiece) is effected with a low output at the start of processing, and the output is increased upon completion of piercing to effect the cutting of the workpiece, satisfactory processing can be effected during piercing and an early period of cutting, but defective processing can gradually occur as the cutting operation proceeds.

It has been confirmed that this occurrence is caused by the fact that the transmitting optical elements (the partial-reflection mirror 8 and the condenser lens 4) absorb part of the laser beam and undergo a temperature rise, so that distortion occurs in their configurations and in the distribution of refractive index, thereby resulting in the deterioration of the beam-focusing characteristic and in a change of the position of the focal point. This phenomenon is referred to as thermal strain, and occurs when such absorptance is present in the transmitting optical elements. In addition, if the absorptance of the transmitting optical elements becomes large due to the attachment of impurities to the surfaces of the transmitting optical elements, the amount of heat generated in the transmitting optical elements becomes even greater, and the deterioration of the beam-focusing characteristic due to thermal strain becomes more pronounced.

Accordingly, in continuous processing (e.g., cutting), the temperature rise of the transmitting optical elements is low and the effect of thermal strain is small during the early period of processing. However, as the processing proceeds, the temperature of the transmitting optical elements rises, and the deterioration of the beam-focusing characteristic and the movement of the position of the focal point become large, thereby inducing defective processing (cutting).

It has been found as a result of experiments that the amount of the above-described deterioration of the focusing characteristic and the amount of movement of the focal position are most pronounced in the TEM00 mode. Hence, it became evident that defective processing frequently occurred because the TEM00 mode was conventionally used for processing (e.g., cutting) for conditions where the TEM00 mode was possible, for the reason that the TEM00 mode theoretically gives the highest focusing characteristic.

For such conventional laser processing apparatuses, only rough criteria have been available for choosing the beam modes. For instance, a lower-order mode, e.g., a single mode which gives a good focusing characteristic, has been used insofar as an output can be secured, while a higher-order mode, which is readily capable of increasing the output, has been used for processing operations that require high output and for other similar purposes. Hence, there has been a drawback in that the beam modes most suitable for processing (e.g., cutting) have not necessarily been used.

SUMMARY OF THE INVENTION

The present invention overcomes this drawback, and has as an object to take into consideration such parameters as (1) the change of the focusing characteristics of respective modes, (2) the movement of the position of the focal point with respect to changes in the heat absorptance of the optical elements, and (3) the laser output, and to make it possible to select a beam mode always most suited to processing (e.g., cutting) on the basis of these parameters.

In accordance with a first aspect of the invention, there is provided a laser processing apparatus (e.g., a laser cutting apparatus) including a laser oscillator, a controller for the laser oscillator, means for detecting an output of the laser oscillator, and means for changing the beam mode of a laser beam outputted by the laser oscillator, the laser processing apparatus comprising: determining means for determining a mode changeover in correspondence with the detected output of the laser oscillator.

In accordance with a second aspect of the invention, there is provided a laser processing apparatus including a laser oscillator, a controller for the laser oscillator, means for detecting an output of the laser oscillator, and means for changing a beam mode of a laser beam outputted by the laser oscillator, the laser processing apparatus comprising: means for detecting an absorptance of a partial-reflection mirror of the oscillator; and determining means for determining a mode changeover in response to the detected absorptance of the partial-reflection mirror.

In accordance with a third aspect of the invention, there is provided a laser processing apparatus including a laser oscillator, a controller for the laser oscillator, means for detecting an output of the laser oscillator, means for changing a beam mode of a laser beam outputted by the laser oscillator, and a focusing optical element for focusing the laser beam, the laser processing apparatus comprising: means for detecting an absorptance of the focusing optical element; and determining means for determining a mode changeover in correspondence with the detected absorptance of the focusing optical element.

In accordance with a fourth aspect of the invention, there is provided a laser processing apparatus including a laser oscillator, a controller for the laser oscillator, means for detecting an output of the laser oscillator, and means for changing a beam mode of a laser beam in correspondence with the output of the laser oscillator, wherein the controller has a beam-mode control unit for controlling the beam mode in correspondence with the output of the laser oscillator.

In accordance with a fifth aspect of the invention, there is provided a laser processing apparatus including a laser oscillator, a controller for the laser oscillator, means for detecting an output of the laser oscillator, and means for changing a beam mode of a laser beam outputted by the laser oscillator, wherein the oscillator has means for detecting an absorptance of a partial-reflection mirror of the oscillator, and the controller has a beam-mode control unit for controlling the beam mode in correspondence with the detected absorptance of the partial-reflection mirror.

In accordance with a sixth aspect of the invention, there is provided a laser processing apparatus including a laser oscillator, a controller for the laser oscillator, means for detecting an output of the laser oscillator, means for changing a beam mode of a laser beam outputted by the laser oscillator, and a focusing optical element for focusing the laser beam, wherein the focusing optical element has absorptance detecting means, and the controller has a beam-mode control unit for controlling the beam mode in correspondence with the absorptance of the focusing optical element as detected by the absorptance detecting means.

In accordance with a seventh aspect of the invention, there is provided a laser processing apparatus including a laser oscillator, a controller for the laser oscillator, means for detecting an output of the laser oscillator, and means for changing a beam mode of a laser beam outputted by the laser oscillator, wherein the oscillator has means for detecting an absorptance of a partial-reflection mirror constituting the oscillator, and the controller has a beam-mode control unit for controlling the beam mode in response to the detected absorptance of the partial-reflection mirror and to the detected output of the laser oscillator.

In accordance with an eighth aspect of the invention, there is provided a laser processing apparatus including a laser oscillator, a controller for the laser oscillator, means for detecting an output of the laser oscillator, means for changing a first beam mode of a laser beam outputted by the laser oscillator to a second beam mode, and a focusing optical element for focusing the laser beam, wherein the focusing optical element has absorptance detecting means, and the controller has a beam-mode control unit for controlling the beam mode in response to the absorptance of the focusing optical element as detected by the absorptance detecting means and to the output of the laser oscillator as detected by the output detecting means.

In accordance with a ninth aspect of the invention, there is provided a laser processing apparatus comprising a laser oscillator, a processing table, a controller for controlling the laser oscillator and the processing table, means for detecting an output of the laser oscillator, and means for changing a first beam mode of a laser beam outputted by the laser oscillator to a second beam mode, wherein the controller has a processing-condition setting unit for setting for each of the first and second beam modes a processing condition corresponding to a material, plate thickness, and processing speed of a workpiece to be processed by the processing apparatus.

In accordance with a tenth aspect of the invention, the laser processing apparatus according to the eighth aspect of the invention is arranged such that the controller has a processing-condition setting unit for setting a processing condition for each of the first and second beam modes, and the processing-condition setting unit has a unit for setting at least any one of the following conditions: a focal position, a processing gas pressure, a nozzle height, a laser output, a pulse frequency, and a pulse duty cycle.

In accordance with an eleventh aspect of the invention, there is provided a laser processing apparatus comprising a laser oscillator, a processing table, a controller for controlling the laser oscillator and the processing table, means for detecting an output of the laser oscillator, and means for changing a beam mode of a laser beam outputted by the laser oscillator from a first beam mode to at least a second beam mode, wherein the controller has a processing-condition setting unit for setting for each of the beam modes a processing condition corresponding to a material, a plate thickness, and a processing profile of a workpiece to be processed by the processing apparatus.

In accordance with a twelfth aspect of the invention, the laser processing apparatus according to the ninth aspect of the invention is arranged such that the controller has a processing-condition setting unit for setting a processing condition for each of the first and second beam modes, and the processing-condition setting unit has a unit for setting at least any one of the following conditions: a processing speed, a focal position, a processing gas pressure, a nozzle height, a laser output, a pulse frequency, and a pulse duty cycle.

Operation

The laser processing apparatus in accordance with the first aspect of the invention makes it possible to select a beam mode suitable for a laser output.

The laser processing apparatus in accordance with the second aspect of the invention makes it possible to select a beam mode suitable for the state of the partial-reflection mirror.

The laser processing apparatus in accordance with the third aspect of the invention makes it possible to select a beam mode suitable for the state of the focusing optical element.

In the laser processing apparatus in accordance with the fourth aspect of the invention, the controller selects a beam mode suitable for the laser output.

In the laser processing apparatus in accordance with the fifth aspect of the invention, the controller selects a beam mode suitable for the state of the partial-reflection mirror.

In the laser processing apparatus in accordance with the sixth aspect of the invention, the controller selects a beam mode suitable for the state of the focusing optical element.

In the laser processing apparatus in accordance with the seventh aspect of the invention, the controller selects a beam mode suitable for the laser output and for the state of the partial-reflection mirror.

In the laser processing apparatus in accordance with the eighth aspect of the invention, the controller selects a beam mode suitable for the laser output and for the state of the focusing optical element.

The laser processing apparatus in accordance with the ninth aspect of the invention selects for each of the beam modes a processing condition corresponding to the material, plate thickness, and processing speed.

The laser processing apparatus in accordance with the tenth aspect of the invention changes at least any one of the focal position, processing gas pressure, nozzle height, laser output, pulse frequency, and pulse duty cycle in correspondence with a change in the beam mode.

The laser processing apparatus in accordance with the eleventh aspect of the invention selects for each of the beam modes a processing condition corresponding to the material, plate thickness, and processing profile.

The laser processing apparatus in accordance with the twelfth aspect of the invention changes at least any one condition of the processing speed, focal position, processing gas pressure, nozzle height, laser output, pulse frequency, and pulse duty cycle in correspondence with a change in the beam mode.

BRIEF DESCRIPTION OF THE DRAWING

FIGS. 20(a), 20(b), 20(c), 20(d), 20(f), and 20(i) are diagrams of a distribution of energy in beam modes obtained from a laser oscillator.

DESCRIPTION OF PREFERRED EMBODIMENTS

First Embodiment

Figure 1:
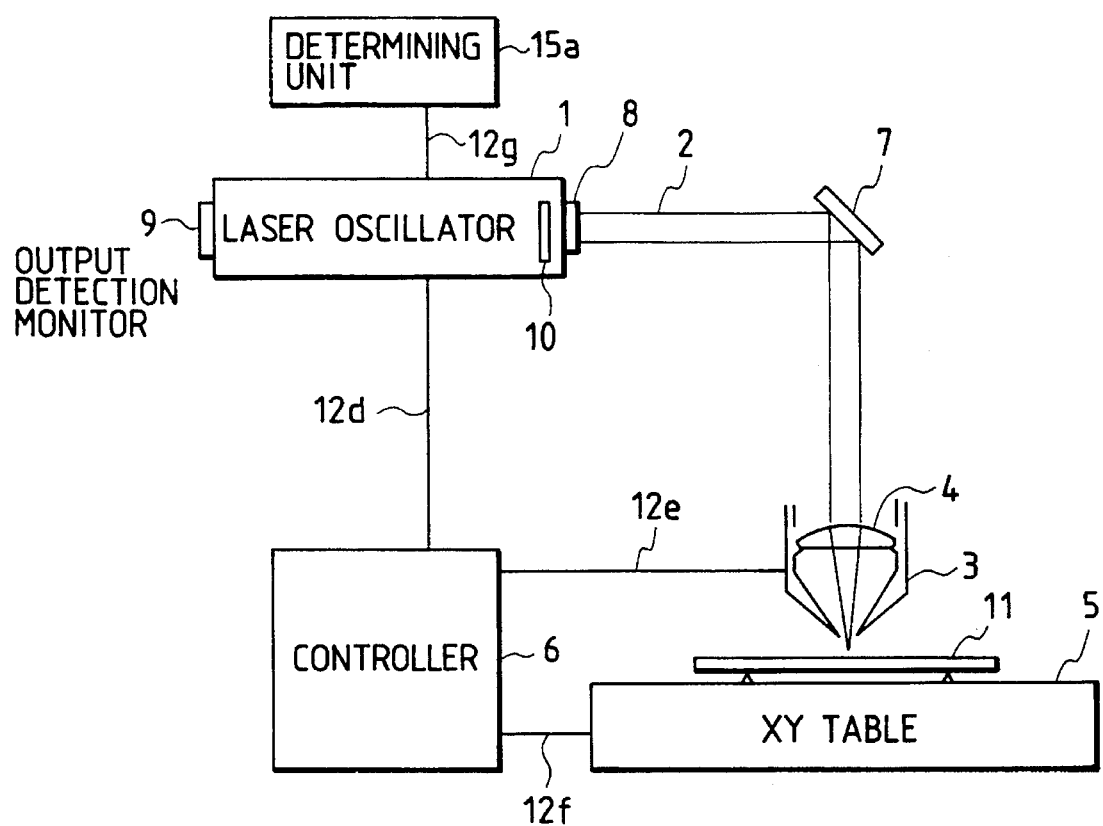
FIG. 1 is a schematic diagram of a laser processing apparatus of an embodiment in accordance with a first aspect of the invention.
Figure 19:
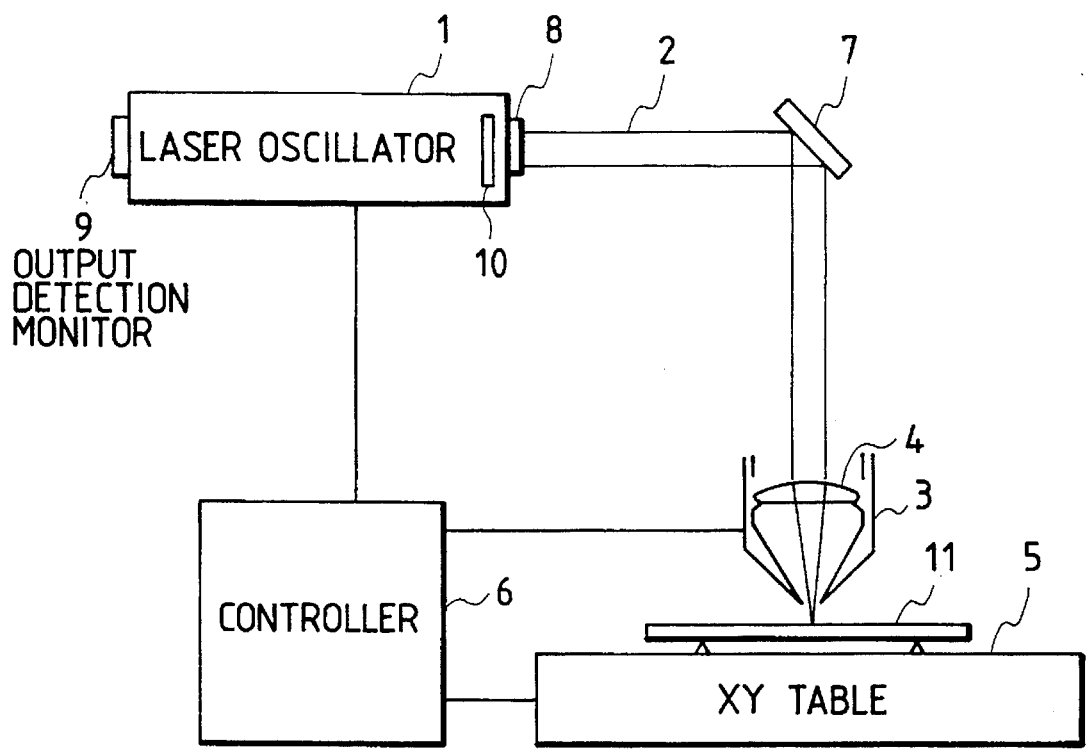
FIG. 19 is a diagram of a conventional laser processing apparatus.

FIG. 1 shows a first embodiment in accordance with the first aspect of the invention. In the drawing, since reference numerals 1 to 11 denote the same as those of the conventional example of FIG. 19, a description thereof will be omitted. Reference numerals 12d, 12e, and 12g denote cables connecting the respective units, and numeral 15a denotes a determining means for determining the changeover of the mode on the basis of an output of an oscillator 1 as detected by the monitor 9. The operation is also the same as in the conventional example, except that the changeover of the mode is determined on the basis of the output of the oscillator.

Figure 2:
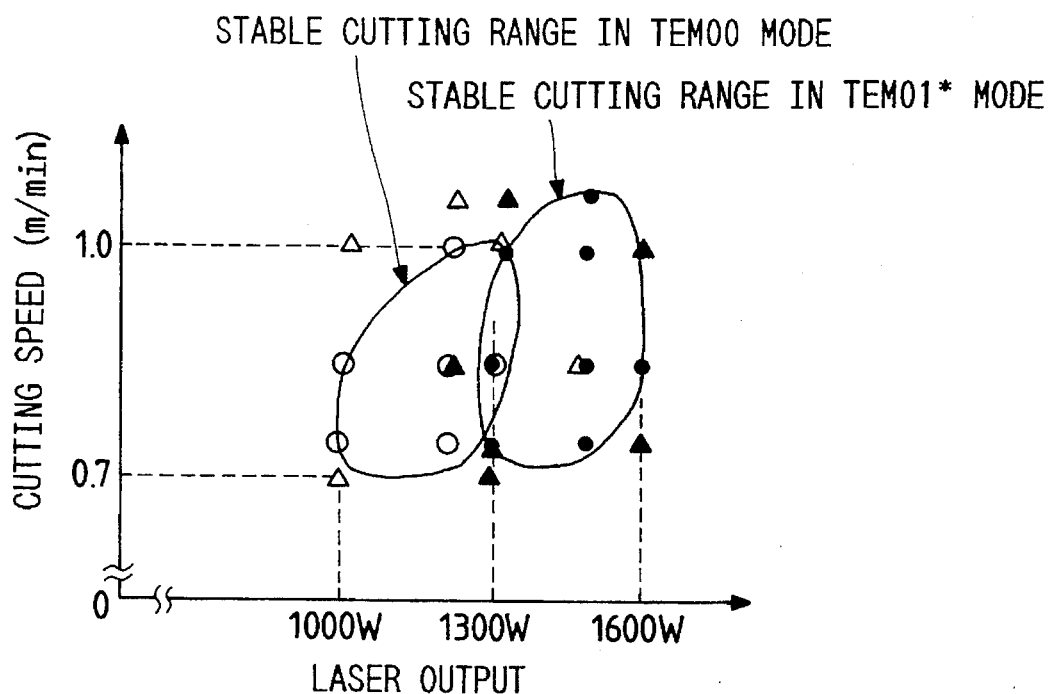
FIG. 2 is an output characteristic diagram showing ranges of stable processing conditions in the laser processing apparatus of the embodiment in accordance with the first aspect of the invention.

Next, a description will be given of the relationship between the mode and the output. FIG. 2 shows an example of results of an experiment in which regions permitting stable continuous processing were examined when the processing of cutting a mild steel plate was implemented by using a laser processing apparatus (including a laser oscillator ML3016F2 made by Mitsubishi Electric Corp. In this drawing figure, the abscissa represents the laser output, while the ordinate represents the processing speed. In this experiment, an examination was made of a 12 mm thick plate of rolled steel, and a laser oscillator with a maximum laser output of 1600 W was used. In addition, the transmission distance from the partial-reflection mirror 10 of the laser oscillator 1 to the condenser lens 4 was approximately 3 to 5 m; oxygen was used as the processing-assist gas; the focal length of the condenser lens was 7.5 inches; and the transmittance of the partial-reflection mirror 10 was 70%. As a result of this experiment, it became apparent that, with about 1300 W of the laser output being set as a boundary level, the TEM00 mode is suitable for processing at a region below that level, while the TEM01* mode is suitable for processing at a region above that level. The values of the absorptance of the partial-reflection mirror and of the condenser lens at that time were each 0.2%.

Figure 3:
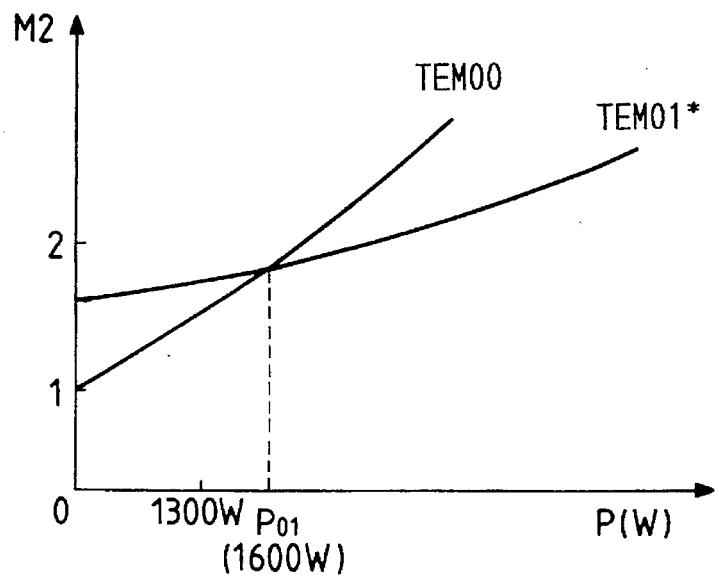
FIG. 3 is a focusing characteristic diagram showing theoretical calculation of changes in the focusing characteristic in a TEM00 mode and a TEM01* mode in the laser processing apparatus of the embodiment in accordance with the first aspect of the invention.

The fact that the regions of processing stability thus differ in accordance with the beam mode can be accounted for by the deterioration of the focusing characteristic and the movement of the focal position which are caused by thermal strains. FIG. 3 shows results of theoretical calculations of changes caused by thermal strains in the partial-reflection mirror 10 on the focusing characteristic with respect to changes in the laser output. As the laser output increased, the amounts of heat generated in the partial-reflection mirror and the condenser lens became large, and the effect of the thermal strains became large. In FIG. 3, an $M^2$ value was used as the amount representing the beam-focusing characteristic (as for $M^2$, see SPIE—The International Society for Optical Engineering, Vol. 1414 "Laser Beam Diagnostics" (1991)). As for this value, when the focusing characteristic of the beam unaffected by the thermal strain in the TEM00 mode, which theoretically provides the highest focusing characteristic, is 1, the focusing characteristics in other modes are represented by relative values. The larger the value, the more deteriorated the beam-focusing characteristic.

It can be appreciated from FIG. 3 that, if a comparison is made between the $M^2$ value of the TEM00 mode and the $M^2$ value of the TEM01* mode, in a region where the laser output is smaller than P01, i.e., in a low-output region, the $M^2$ value of the TEM00 mode is smaller than the $M^2$ value of the TEM01* mode and its focusing characteristic is better; however, if the laser output exceeds P01, the $M^2$ value of the TEM01* mode becomes smaller, meaning that the focusing characteristic of the TEM01* mode is better than the focusing characteristic of the TEM00 mode. Thus, the beam-focusing characteristic changes if the absorptance increases because of the effect of thermal strains in the transmitting optical elements, and the phenomenon of reversal of the focusing characteristic occurs between the modes. Accordingly, in the region where the laser output is greater than P01, a better focusing characteristic is obtained if the TEM01* mode, rather than the TEM00 mode, is selected.

However, it does not necessarily follow that the optimum beam mode can be selected if a selection is made from the TEM00 mode and the TEM01* mode with the value of P01 in FIG. 3 set as a boundary. For instance, the value of 1300 W in FIG. 2 is a value smaller than the value of P01 in FIG. 3. This is attributable to the following factor. The characteristics in FIG. 3 are the steady state values. In actual processing, the amounts of heat generated in the partial-reflection mirror and the condenser lens are zero at the start of processing. As the processing proceeds (time elapses), the laser beam is partly absorbed, the temperature rises, and the operation undergoes transition to the steady state. The time required for the transition to the steady state is determined by the calorific capacities of the partial-reflection mirror and the condenser lens. At the processing start, the $M^2$ value of each respective mode is the value when the laser output is 0 W. Then, as processing proceeds, the $M^2$ value of the respective mode becomes the value which exists at a time when the laser output is obtained during processing (e.g., cutting) (a steady-state value). If the amount of change of the $M^2$ value is small from the processing start to the steady state, better processing stability is obtained during continuous processing. In view of this fact, the amount of change of the $M^2$ value of the TEM00 mode is larger than the amount of change of the $M^2$ value of the TEM01* mode. Namely, in processing in the TEM00 mode, the change in the deterioration of the focusing characteristic is large between an early period of starting and the period after continuous processing. Hence, since the processing conditions which were optimum during the early period of processing cease to be optimum after continuous processing, defective processing results. Therefore, the value of 1300 W shown in FIG. 2 is smaller than the value of P01 shown in FIG. 3.

Figure 4:
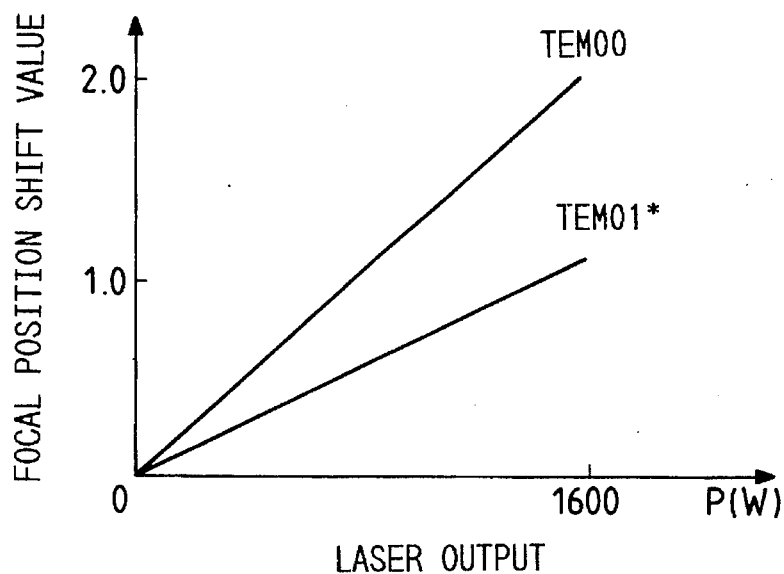
FIG. 4 is a characteristic diagram showing theoretical calculation of changes in the focal position in a TEM00 mode and a TEM01* mode in the laser processing apparatus of the embodiment in accordance with the first aspect of the invention.

In addition, FIG. 4 shows results of theoretical calculation of the change of the position of the focal point of the laser beam with respect to the change in the laser output, shown in FIG. 2, of the laser oscillator 1. It can be seen from FIG. 4 that, if the laser output changes, the amount of movement of the focal position of the laser beam changes because of the effect of thermal strains. Furthermore, the amount of change of the focal position in the TEM00 mode is greater than the amount of change of the focal position in the TEM01* mode, further explaining the fact that the value of 1300 W in FIG. 2 becomes smaller than the value of P01. Accordingly, in a case where processing is effected by properly using the TEM00 mode and the TEM01* mode, the laser output value which serves as a criterion for changing over the beam mode generally needs to be determined by taking into consideration both the rate of change of the $M^2$ value and also the change of the focal position, in addition to the value of P01, except in the case of processing in which only the absolute value of the focusing characteristic is predominant.

By making a comparison between the laser output value for changing over the beam mode as determined in the above-described manner on the one hand, and a laser output value commanded from the controller or a detected value of an output detection sensor of the laser oscillator on the other hand, a determination is made by the determining means as to which of the TEM00 mode and the TEM01* mode is to be selected, and the result is displayed.

Second Embodiment

Figure 5:
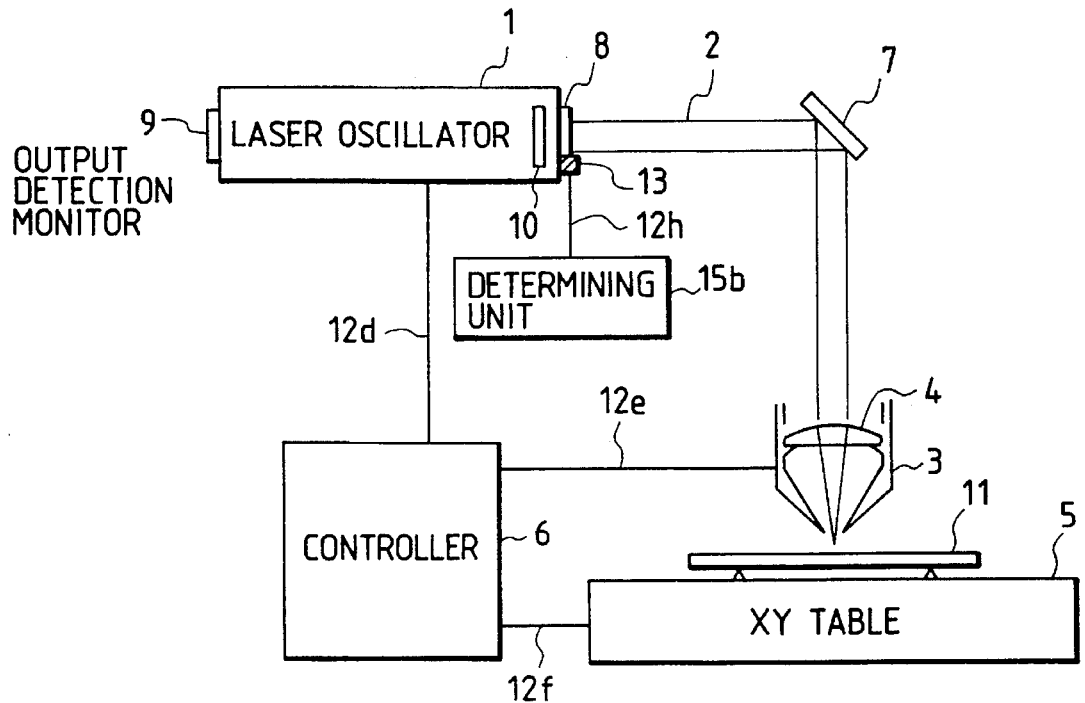
FIG. 5 is a schematic diagram of a laser processing apparatus of an embodiment in accordance with a second aspect of the invention.

FIG. 5 shows an embodiment in accordance with a second aspect of the invention. In this embodiment, reference numeral 13 denotes a detector for detecting an energy absorptance of a partial-reflection mirror 8, and numeral 15b denotes a determining means for determining a mode changeover on the basis of the detected value of the detector 13. This embodiment differs from the first embodiment in that the detected value of absorptance of the partial-reflection mirror is monitored. Since the product of the laser output and the value of absorptance of the partial-reflection mirror is the amount of heat generated in the partial-reflection mirror, the determination for effecting a changeover between the TEM00 mode and the TEM01* mode is performed by the determining means 15b by using this value as a parameter, and the result is displayed.

Third Embodiment

Figure 6:
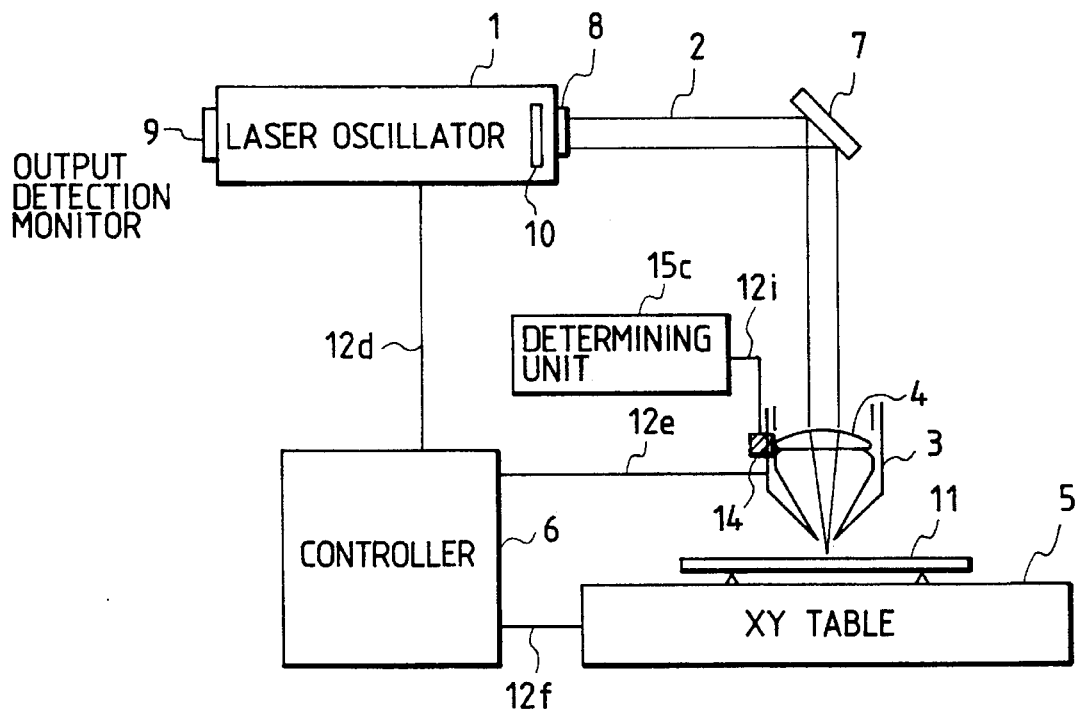
FIG. 6 is a schematic diagram of a laser processing apparatus of an embodiment in accordance with a third aspect of the invention.

FIG. 6 shows an embodiment in accordance with the third aspect of the invention. In this embodiment, reference numeral 14 denotes a detector for detecting the energy absorptance of the condenser lens 4, and numeral 15c denotes a determining means for determining a mode changeover on the basis of the detected value of the detector 14. This embodiment differs from the second embodiment in that the detected value of absorptance of the condenser lens is monitored. Since the product of the laser output and the value of absorptance of the condenser lens is the amount of heat generated in the condenser lens, the determination for effecting a changeover between the TEM00 mode and the TEM01* mode is performed by the determining means 15c by using this value as a parameter, and the result is displayed.

Fourth Embodiment

Figure 7:
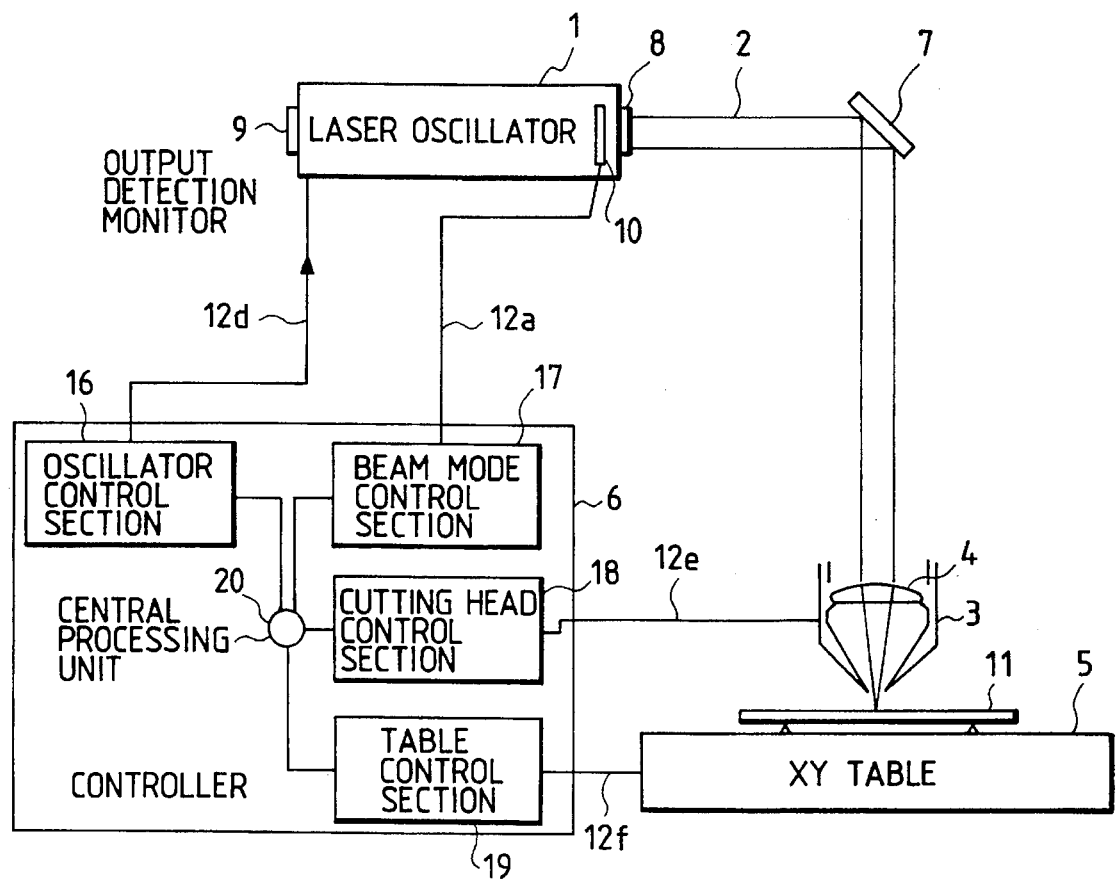
FIG. 7 is a schematic diagram of a laser processing apparatus of an embodiment in accordance with a fourth aspect of the invention.

FIG. 7 shows an embodiment in accordance with the fourth aspect of the invention. In the drawing, reference numeral 16 denotes an oscillator control unit for transmitting an output command to the oscillator and fetching a detected output signal therefrom; 17, a beam-mode control unit which has internal mode-changeover data and a determining means and for outputting a changeover command to the beam-mode changeover unit 10; 18, a processing-head control unit for controlling the lens position of the processing head and the gas pressure; 19, a table control unit for controlling the movement of a processing table on which the workpiece is mounted; and 20, a central processing unit for controlling the transmission and receipt of signals between these control units. Numeral 6 denotes a controller comprised of the aforementioned control units.

Figure 8:
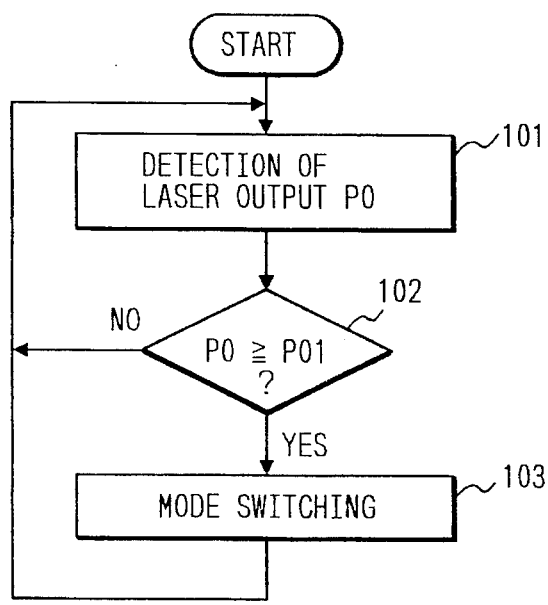
FIG. 8 is a flowchart for a mode changeover in the embodiment in accordance with the fourth aspect of the invention.

Next, a description will be given of the operation. The laser oscillator 1 outputs a laser beam upon receipt of an output command from the oscillator control unit 16. This output is detected by the output detection monitor 9, and is transmitted to the beam-mode control unit 17. The beam-mode control unit 17 compares the laser output value with its internal mode changeover data, determines whether or not the mode is appropriate with respect to the laser output, and outputs a changeover command to the beam-mode changeover unit 10, as necessary. The flowchart for automatic control during outputting in the TEM00 mode is shown in FIG. 8.

Fifth Embodiment

A description will be given of an embodiment in accordance with the fifth and seventh aspects of the invention. Although stable processing can be generally carried out in accordance with the fourth embodiment, an increase in the heat absorptance of the partial-reflection mirror is unavoidable because of the attachment of dirt thereto and for other similar reasons when the laser processing apparatus is used for long periods of time. The thermal strain in the partial-reflection mirror, which causes the deterioration in the focusing characteristic, is dependent on the internal calorific value W (of the partial-reflection mirror)=P×β (P is a laser output, β is an absorptance). Hence, if the absorptance β increases because of, for example, the attachment of impurities to the surface of the partial-reflection mirror when the laser processing apparatus is used over long periods of time, the laser output value serving as a criterion for a mode changeover, as has been described above in connection with the first and fourth embodiments, changes substantially toward the low-output side. In this embodiment, a description will be given of a method of selecting a most suitable mode more accurately when such a laser processing apparatus is used over long periods of time.

Figure 9:
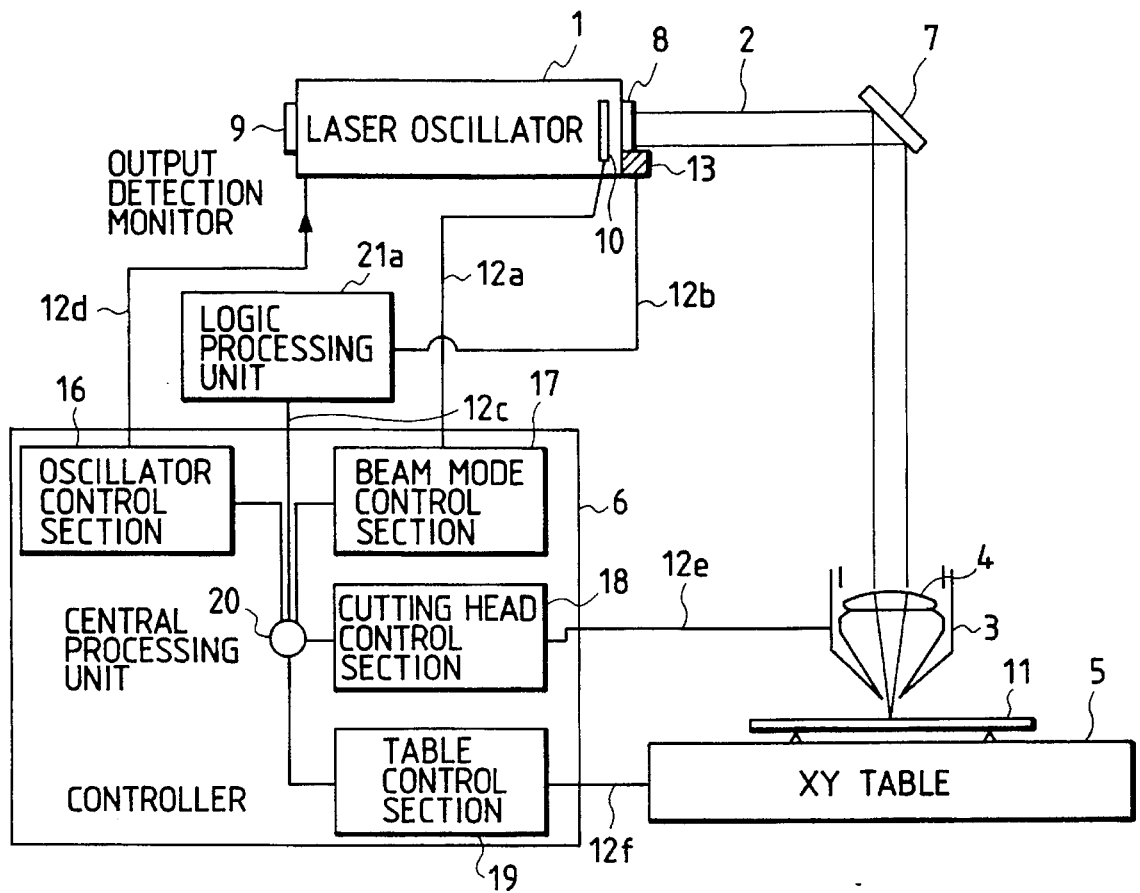
FIG. 9 is a schematic diagram of a laser processing apparatus of an embodiment in accordance with a fifth aspect of the invention.
Figure 10:
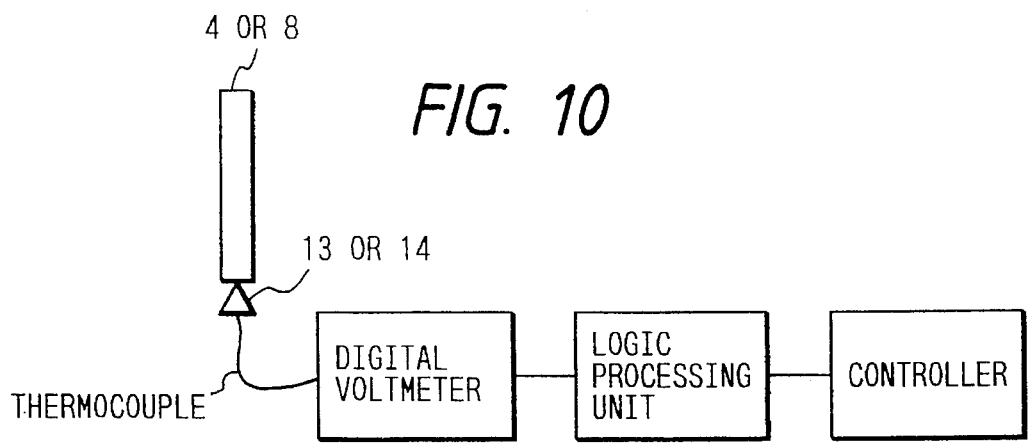
FIG. 10 is a schematic diagram of an absorptance measuring instrument of the laser processing apparatus shown in FIG. 9.
Figure 11:
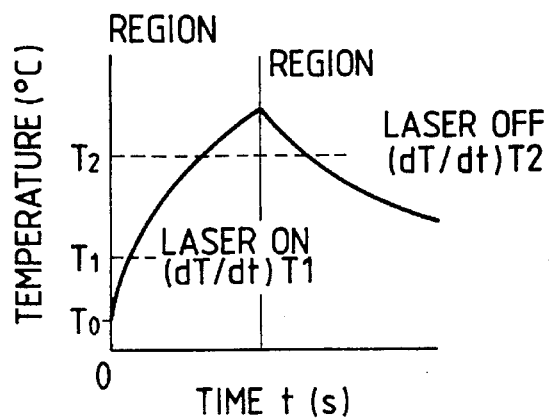
FIG. 11 is a diagram of a temperature-change curve of a partial-reflection mirror or a condenser lens.

The configuration of the apparatus is shown in FIG. 9. The configuration according to this embodiment differs from the first aspect of the invention, e.g., in that the following elements are provided in addition to the partial-reflection mirror 8: a detector 13 for detecting temperature, a logic processing unit 21a (LPU) for calculating a value of absorptance from the degree in temperature rise obtained from the detector 13, a signal line 12b for connecting the detector 13 to the unit 21a, and a signal line 12c for sending/receiving signals between the unit 21a and a central processing unit 20. More particularly, this apparatus differs from the apparatus in accordance with the first aspect of the invention in that the detector 13 for detecting the value of absorptance is provided on the partial-reflection mirror 8 and this absorptance detector is a device in which, as shown in FIG. 10, a thermocouple is attached to an edge portion of the partial-reflection mirror 8 or the condenser lens 4, and the absorptance is detected by means of the degree of its temperature rise dT/dt. FIG. 11 is a diagram illustrating the temperature-change characteristic of the partial-reflection mirror, or of the condenser lens provided with this detector, when the laser is turned on and off. Here, dT represents a temperature increment, and dt represents a time increment. From the temperature change such as the one shown in FIG. 11, the absorptance α can be determined from the following formula:

$$\alpha = [m \times C\{(dT/dt)T1 - (dT/dt)T2\} + h \times S(T1 - T2)]/Pi$$

where, m: mass

C: specific heat h: heat transfer coefficient

S: surface area

Pi: laser output

As shown in FIGS. 9 and 10, the logic processing unit 21a can be configured to receive signals from a digital voltmeter coupled between the detector 13 (or 14) and the LPU 21a. In response to a signal from the CPU 20, the LPU 21a begins gathering temperature data, as shown in FIGS. 10–11, via the digital voltmeter. This data is then used to calculate dT/dt and, once the laser output signal $P_i$ is obtained, the absorptance α. The calculated value for the absorptance index α can then be output to the CPU 20.

Figure 12:
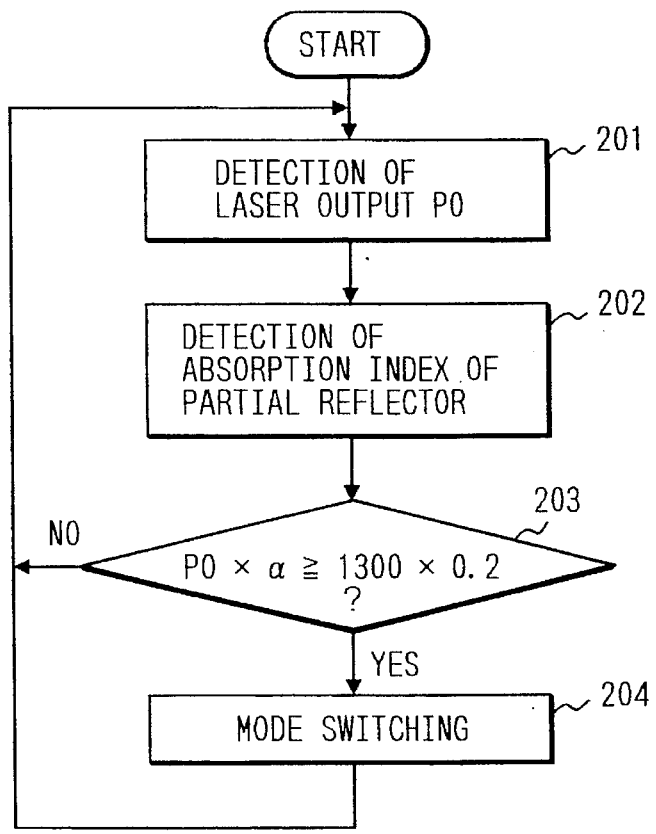
FIG. 12 is a flowchart for selecting processing conditions in the embodiment in accordance with the fifth aspect of the invention.

Next, a description will be given of the operation. A laser output, commanded from the controller to the laser oscillator, and the detected value of absorptance of the partial-reflection mirror are monitored. Since the product of the laser output and the value of absorptance of the partial-reflection mirror is the amount of heat generated in the partial-reflection mirror, a changeover between the TEM00 mode and the TEM01* mode is effected by using this value as a parameter. That is, if the laser output of 1300 W when the absorptance is 0.2% is the laser output for effecting a changeover between the TEM00 mode and the TEM01* mode, then, if the absorptance rises to 0.3%, the laser output for effecting a changeover between the TEM00 mode and the TEM01* mode can be determined as 1300/0.3*0.2=870 W. A flowchart for a mode changeover in a case where the laser beam is being outputted in the TEM00 mode is shown in FIG. 12. An optimum beam mode can be selected by selecting the TEM00 mode at a laser output below the thus-determined value of the laser output whose mode is to be changed over, and by selecting the TEM01* mode at a laser output above that value. By making a comparison between a laser output value determined as described above for changing over the beam mode on the one hand, and a laser output value commanded from the controller or a detected value of the output detection sensor of the laser oscillator on the other, a determination is made by the beam-mode control unit as to which of the TEM00 mode and the TEM01* mode is to be selected, so as to automatically control the mode changeover unit of the laser oscillator, thereby effecting a changeover.

Sixth Embodiment

A description will be given of an embodiment in accordance with sixth and eighth aspects of the invention. Although stable processing generally can be carried out in accordance with the fourth and fifth embodiments, an increase in the heat absorptance of the condenser lens is unavoidable due to the attachment of dirt thereto and for other similar reasons when the laser processing apparatus is used for long periods of time. The thermal strain in the condenser lens, which causes the deterioration in the focusing characteristic, is dependent on the internal calorific value W (of the condenser lens)=P×β (P is a laser output, β is an absorptance). Hence, if the absorptance β increases because of, for example, the attachment of impurities onto the surface of the condenser lens when the laser processing apparatus is used over long periods of time, the value of the laser output serving as a criterion at the time of a mode changeover, which has been described in connection with the first embodiment, changes substantially toward the low-output side. In this embodiment, a description will be given of a method of selecting a most suitable mode more accurately when such a laser processing apparatus is used over long periods of time.

Figure 13:
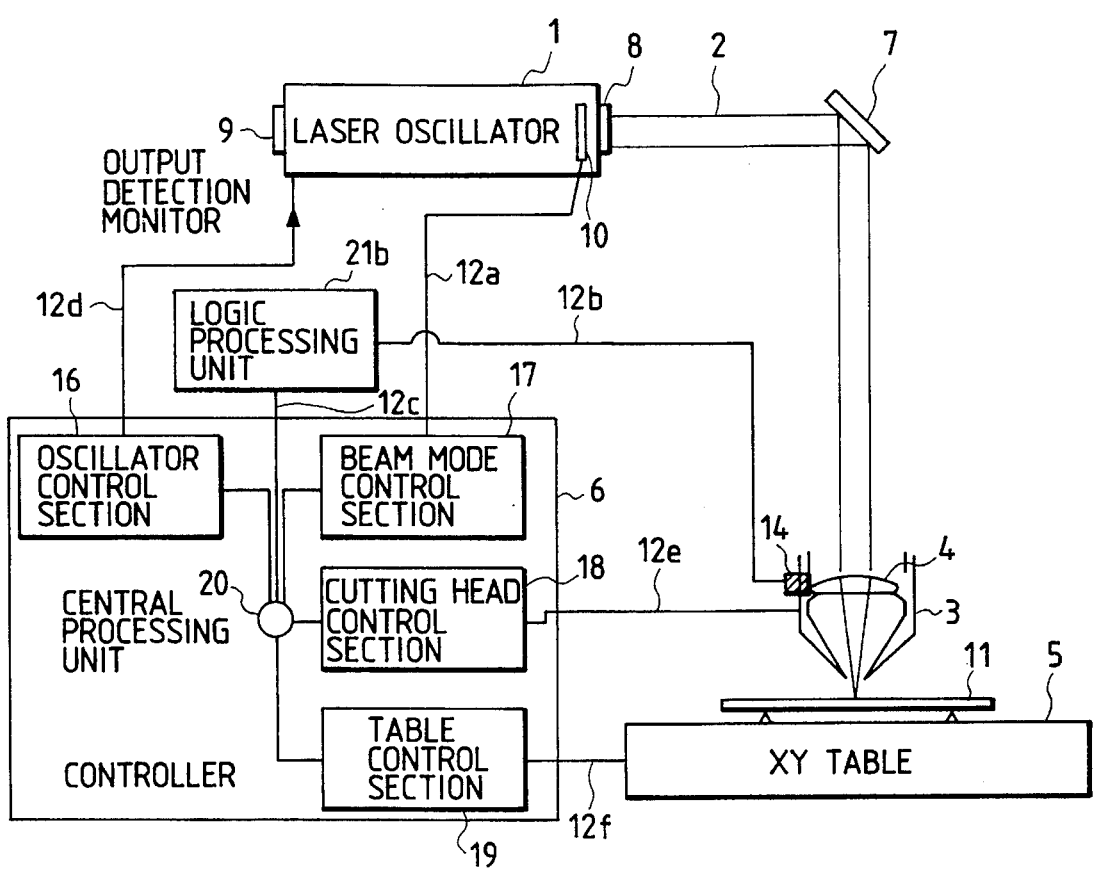
FIG. 13 is a schematic diagram of a laser processing apparatus of an embodiment in accordance with a sixth aspect of the invention.

The configuration of the apparatus is shown in FIG. 13. This embodiment is substantially the same as the 5th embodiment, except that a logic processing unit 21b detects temperature data from a detector 14 mounted on the condenser lens 4. Accordingly, the values dT/dt and the absorptance index α are calculated for the condenser lens 4 instead. This apparatus differs from the apparatus in accordance with the fifth aspect of the invention, but is identical with the same except that the detector 14 for detecting the value of absorptance is provided on the condenser lens 4. Next, a description will be given of the operation. A laser output commanded from the controller to the laser oscillator and a detected value of the detector 12 for detecting the value of absorptance of the condenser lens are monitored. Since the product of the laser output and the value of absorptance of the condenser lens is the amount of heat generated in the condenser lens, a changeover between the TEM00 mode and the TEM01* mode is effected by using this value as a parameter. That is, if the laser output of 1300 W, when the absorptance is 0.2%, is the laser output for effecting a changeover between the TEM00 mode and the TEM01* mode, then, if the absorptance rises to 0.3%, the laser output for effecting a changeover between the TEM00 mode and the TEM01* mode can be determined as 1300/0.3*0.2=870 W.

Figure 14:
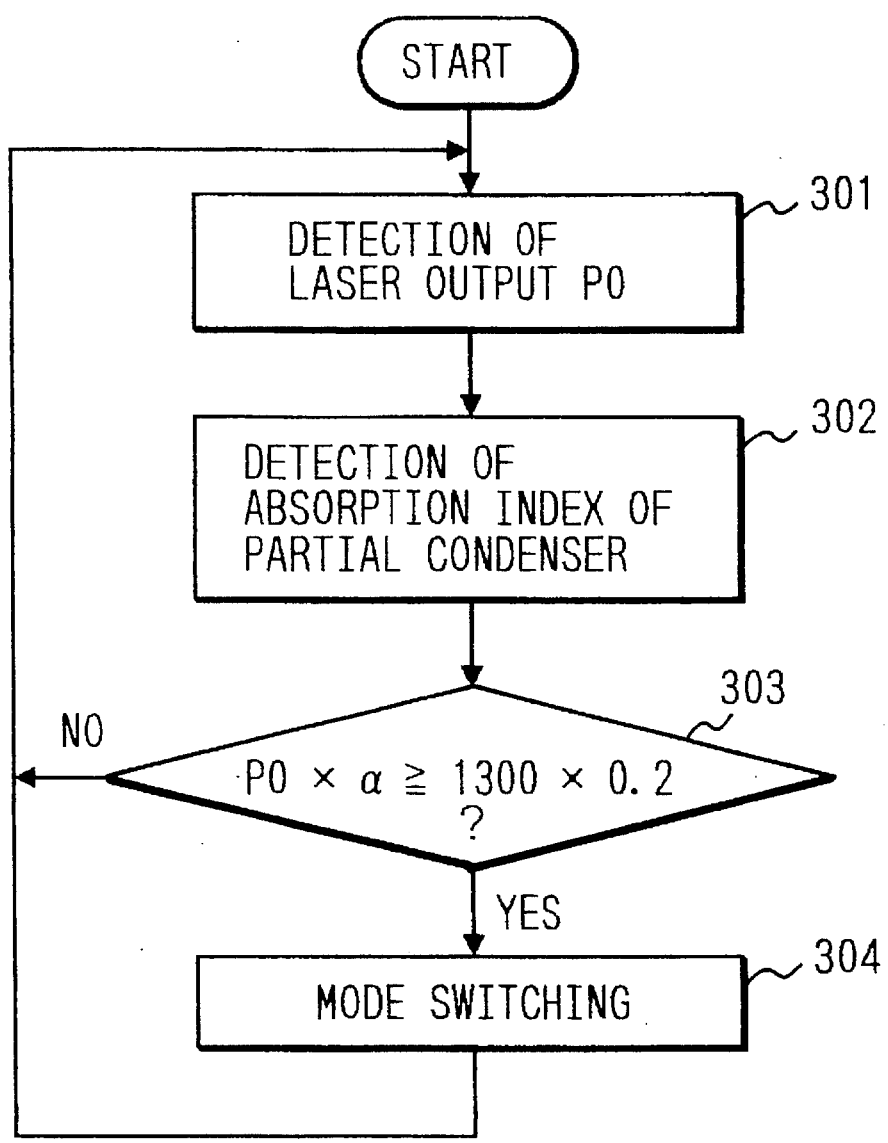
FIG. 14 is a flowchart for selecting the processing conditions in the embodiment in accordance with the sixth aspect of the invention.

FIG. 14 shows flowchart for a mode changeover in the case where the laser beam is being outputted in the TEM00 mode in the same way as in the fifth embodiment. An optimum beam mode can be selected by selecting the TEM00 mode at a laser output below the thus-determined value of the laser output whose mode is to be changed over, and by selecting the TEM01* mode at a laser output above that value. By making a comparison between a laser output value determined as described above for changing over the beam mode on the one hand, and a laser output value commanded from the controller or a detected value of the output detection sensor of the laser oscillator on the other, a determination is made by the beam-mode control unit as to which of the TEM00 mode and the TEM01* mode is to be selected, so as automatically to control the mode changeover unit of the laser oscillator, thereby effecting a changeover.

Seventh Embodiment

A description will be given of an embodiment in accordance with seventh and eighth aspects of the invention. The configuration of this apparatus is identical to one in which the fifth and sixth embodiments are combined. As shown in the fifth and sixth embodiments, increases in heat absorptances of the partial-reflection mirror and the condenser lens are unavoidable due to the attachment of dirt thereto and for other similar reasons when the laser processing apparatus is used for long periods of time. In this seventh embodiment, this aspect is taken into consideration, and absorptance detectors are attached to both the partial-reflection mirror and the condenser lens. In this embodiment, a laser output value commanded from the controller to the laser oscillator and detected values of respective absorptances of the partial-reflection mirror and the condenser lens are monitored. As already described, the product of the laser output and the value of absorptance is the amount of heat generated in each transmitting optical element.

In determining the laser output value for more accurately effecting a changeover between the TEM00 mode and the TEM01* mode, it is advantageous to take into consideration the values of absorptances of the partial-reflection mirror and the condenser lens, thereby making it possible to realize more stable processing. An optimum beam mode can be selected by selecting the TEM00 mode at a laser output below the thus-determined value of the laser output whose mode is to be changed over, and by selecting the TEM01* mode at a laser output above that value. By making a comparison between a laser output value determined as described above for changing over the beam mode on the one hand, and a laser output value commanded from the controller or a detected value of the output detection sensor of the laser oscillator on the other hand, a determination is made by the beam-mode control unit as to which of the TEM00 mode and the TEM01* mode is to be selected, so as to automatically control the mode changeover unit of the laser oscillator, thereby effecting a changeover.

Although, in the above-described embodiments, a description has been given of an example in which the mode is changed over between the TEM00 mode and the TEM01* mode, the present invention is not restricted to the same. For instance, the mode may be changed over between the TEM01* mode and TEM10, and a similar effect is obtained in a changeover between other beam modes.

Eighth Embodiment

Figure 15:
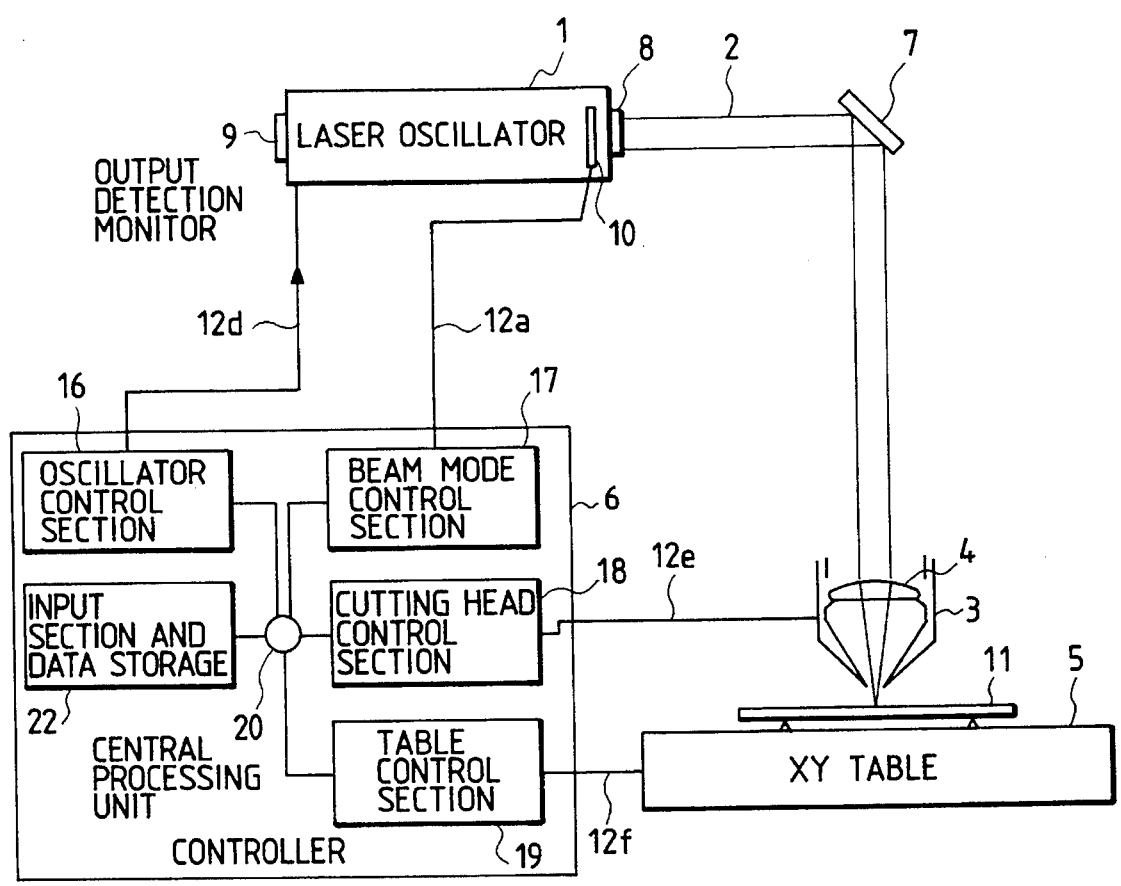
FIG. 15 is a schematic diagram of a laser processing apparatus of an embodiment in accordance with ninth, 10th, and 12th aspects of the invention.

Referring now to FIG. 15, a description will be given of an embodiment in accordance with ninth, tenth and twelfth aspects of the invention. In FIG. 15, reference numeral 22 denotes an input unit disposed in the controller and having a data storage unit. Stored in the storage unit of this controller are processing conditions such as the focal position, processing gas pressure, nozzle height, laser output, the form of laser oscillation output (a continuous wave or a pulse wave), pulse frequency, pulse duty, etc., in correspondence with the parameters of the material, plate thickness, and processing speed of the workpiece. If the operator selects these parameters, processing is performed with processing conditions corresponding to them. However, even if the material, plate thickness, and processing speed are the same, if the beam mode differs, the optimum processing conditions differ. In this embodiment, in addition to the material, plate thickness, and processing speed, processing conditions corresponding to the beam modes are set in advance in the storage unit of the controller, and the aforementioned processing conditions are fetched from the storage unit in correspondence with a beam-mode changeover, so as to control the laser processing apparatus.

Figure 16:
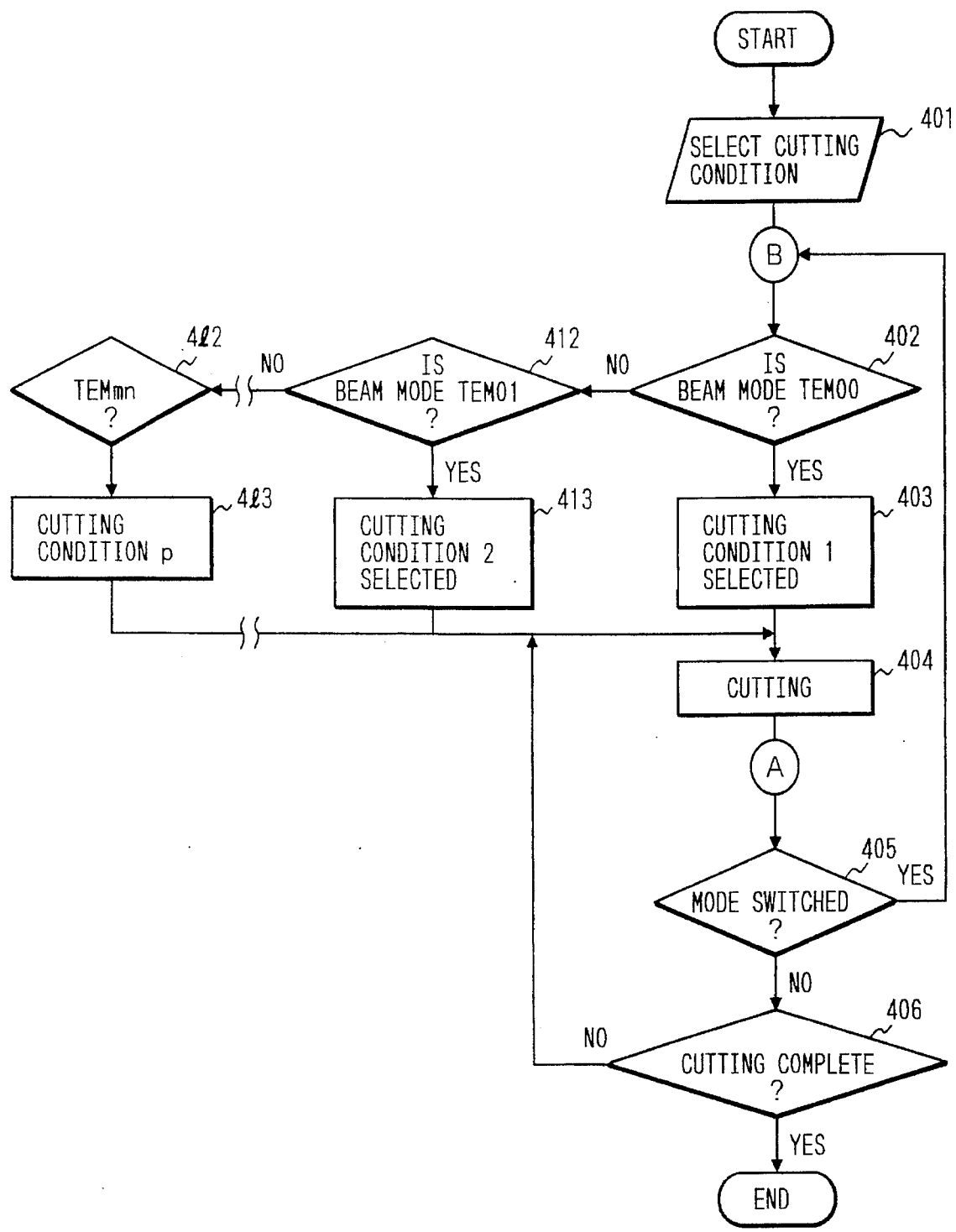
FIG. 16 is a flowchart for selecting the processing conditions in the embodiment in accordance with the ninth, 10th, and 12th aspects of the invention.

By adopting the above-described arrangement, it becomes possible constantly to effect processing under optimum conditions without being affected by a change in conditions accompanying the beam-mode changeover during processing. A flowchart of this case is shown in FIG. 16 by way of example. In the drawing, there are cases where flowcharts shown in FIGS. 8, 12 and 14 are inserted in A, and if the mode changeover occurs in this flow, the operation returns to B, and processing conditions are selected again. In addition, the number of mode selections is determined by the number of modes prepared in the laser oscillator used.

Ninth Embodiment

Figure 17:
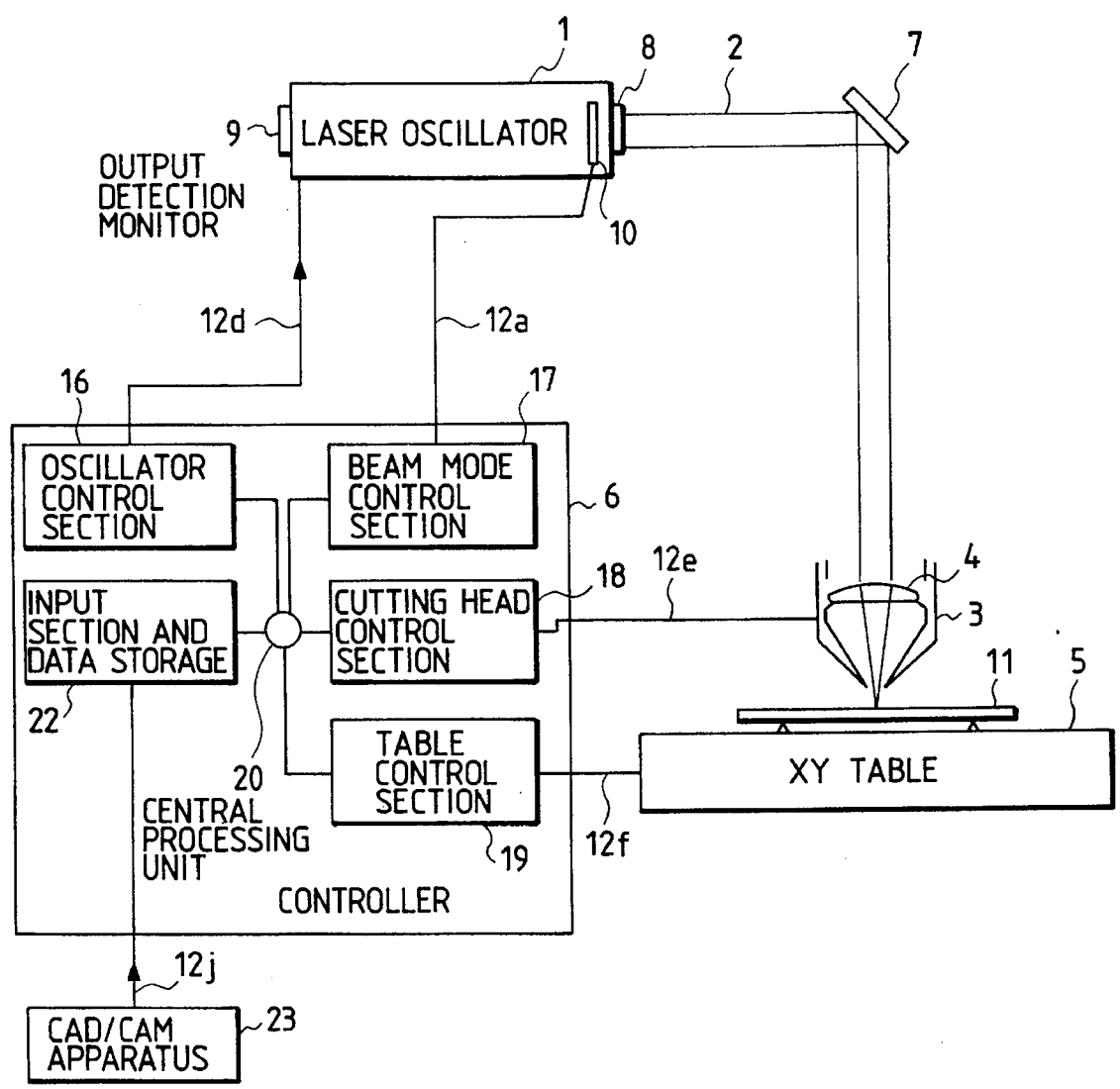
FIG. 17 is a schematic diagram of a laser processing apparatus of an embodiment in accordance with an 11th aspect of the invention.
Figure 18:
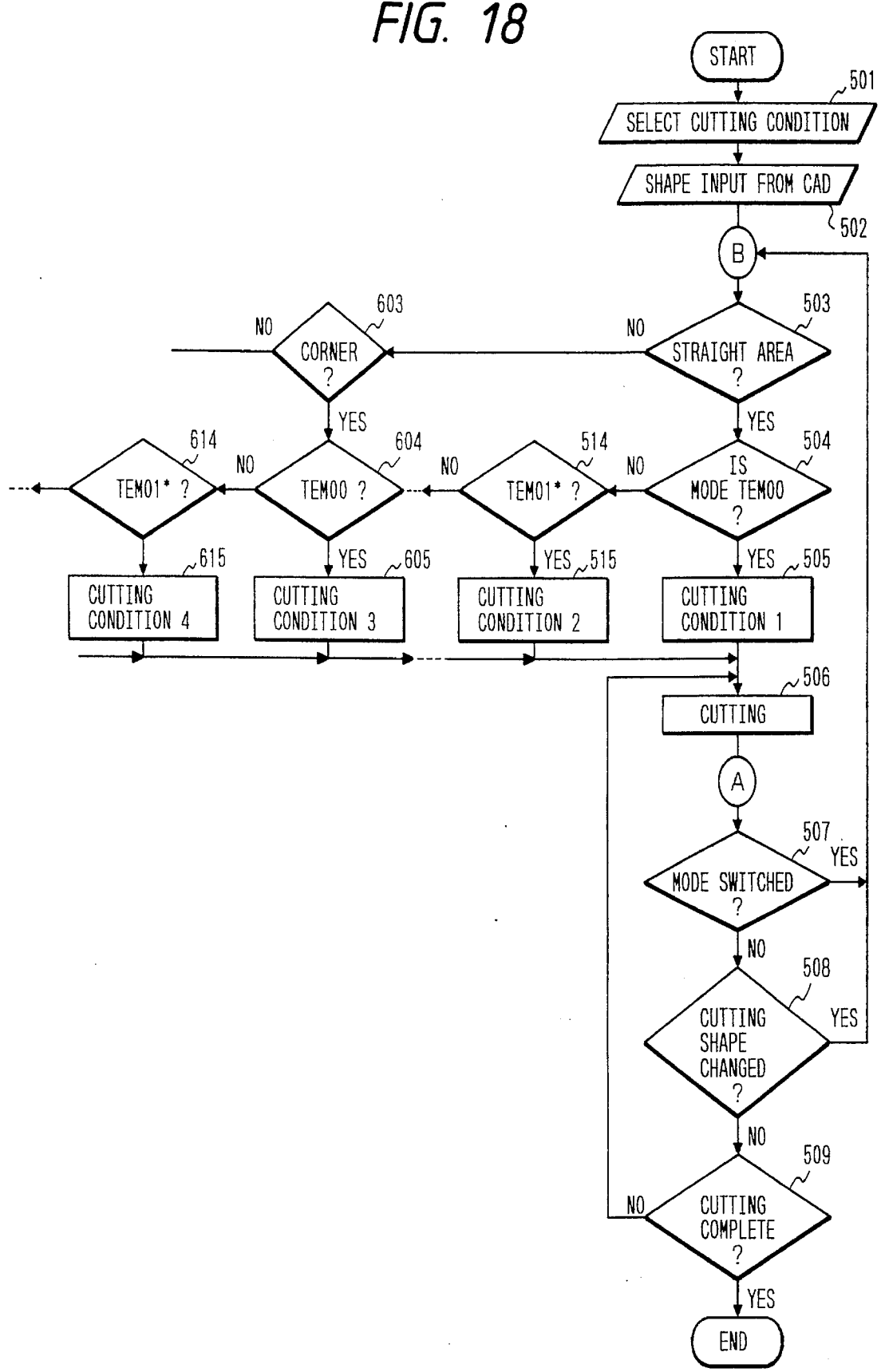
FIG. 18 is a flowchart for selecting the processing conditions in the embodiment in accordance with the 11th aspect of the invention.

Referring now to FIG. 17, a description will be given of a ninth embodiment in accordance with the eleventh aspect of the invention. Although the eighth embodiment is an example of a processing system in which the operator selects the material, plate thickness, and processing speed, in recent years there have been many processing apparatuses in which, once the material, plate thickness, and processing profile are determined, the processing speed for each processing portion is automatically set by the controller. For instance, with respect to a rectilinear portion, processing is carried out at the highest processing speed corresponding to its material and plate thickness, while, with respect to a corner portion or a fine profile portion, processing is carried out at a low speed. In this case, the processing speed becomes one processing condition stored in advance in the controller. In this embodiment as well, the processing conditions vary in accordance with the beam mode, as described in the eighth embodiment. Accordingly, in addition to the material, plate thickness, and processing speed, processing conditions corresponding to the beam modes are set in advance in the storage unit of the controller, and the aforementioned processing conditions are fetched from the storage unit in correspondence with a beam-mode changeover, so as to control the laser processing apparatus. Thus, it becomes possible to constantly effect processing under optimum conditions without being affected by a change in conditions accompanying the beam-mode changeover during processing. A flowchart of this case is shown in FIG. 18 by way of example. Since A and B in the drawing are the same as in FIG. 16, a description thereof will be omitted. In the ninth embodiment, unlike the eighth embodiment, it becomes possible to select optimum conditions in correspondence with not only the mode change but also a profile portion which is actually being processed.

Advantages of the Invention

As described above, in accordance with the present invention, a laser beam mode optimally suited for laser processing can be selected in correspondence with both a change in the output of the laser oscillator and also a change in the state of the partial-reflection mirror and the condenser lens, so that there is the advantage that it is possible to obtain an apparatus having excellent processing stability with respect to various laser processing or operations.

Furthermore, since optimum processing conditions of the workpiece can be set for each beam mode, there is an outstanding advantage in that processing can always be performed on a stable basis with respect to a change in the beam mode during processing.

What is claimed is:

1. A laser processing apparatus comprising:

a laser oscillator constructed to output a laser beam;

an output detector for detecting a laser beam output level of said laser oscillator;

a mode changeover unit disposed to change the laser beam from one beam mode to another beam mode in response to an input provided by an operator; and a determining unit, coupled to said output detector, for calculating preferred mode information based on a comparison of stored information with the output level detected by said detector and for supplying the preferred mode information to the operator.

2. A laser processing apparatus according to claim 1, wherein the preferred mode information is displayed by said determining unit.

3. A laser processing apparatus comprising:

a laser oscillator constructed to output a laser beam;

a partial-reflection mirror coupled into a path of the laser beam;

a detector for detecting an absorptance of said partial-reflection mirror;

a mode changeover unit disposed to change the laser beam from one beam mode to another beam mode in response to an input provided by an operator; and a determining unit, coupled to said detector, for calculating preferred mode information based on a comparison of stored information with the absorptance detected by said detector and for supplying the preferred mode information to the operator.

4. A laser processing apparatus according to claim 2, wherein the preferred mode information is displayed by said determining unit.

5. A laser processing apparatus comprising:

a laser oscillator constructed to output a laser beam;

a focusing optical element coupled into a path of the laser beam;

a detector for detecting an absorptance of said focusing optical element;

a mode changeover unit disposed to change the laser beam from one beam mode to another beam mode in response to an input provided by an operator; and a determining unit, coupled to said detector, for calculating preferred mode information based on a comparison of stored information with the absorptance detected by said detector and for supplying the preferred mode information to the operator.

6. A laser processing apparatus according to claim 5, wherein the preferred mode information is displayed by said determining unit.

7. A laser processing apparatus comprising:

a laser oscillator constructed to output a laser beam;

an output detector for detecting a laser beam output level of said laser oscillator;

a mode changeover unit disposed to change the laser beam from one beam mode to another beam mode in response to a changeover command; and a beam-mode control unit, coupled between said output detector and said mode changeover unit, for outputting the changeover command to said mode changeover unit if the output level detected by said output detector satisfies a predetermined condition.

8. A laser processing apparatus according to claim 7, wherein said beam-mode control unit compares the detected laser beam output level with internal mode changeover data, and, if the comparison yields a given result, outputs the changeover command to said mode changeover unit.

9. A laser processing apparatus according to claim 7, wherein said beam-mode control unit is incorporated into a controller, operatively connected to said laser oscillator, for controlling said laser oscillator in accordance with a plurality of processing conditions.

10. A laser processing apparatus according to claim 7, further comprising a controller, operatively connected to said laser oscillator, for controlling said laser oscillator in accordance with one of a plurality of sets of stored processing conditions, whereby each of the sets of stored processing conditions is unique to one of the beam modes, respectively.

11. A laser processing apparatus according to claim 10, wherein the plurality of sets of stored processing conditions are stored in a data storage unit internal to said controller.

12. A laser processing apparatus according to claim 10, further comprising a processing table for fixing a workpiece to be processed in a path of the laser beam.

13. A laser processing apparatus according to claim 10, wherein the stored processing conditions are tailored to workpieces to be processed by said apparatus, and include parameters relating to at least any of a composition of the workpiece, a thickness of the workpiece, a processing speed for the workpiece, and a processing profile for the workpiece.

14. A laser processing apparatus according to claim 10, wherein the stored processing conditions are tailored to workpieces to be processed by said apparatus, and include setting values for at least any of a processing gas pressure, a nozzle height, a laser output level, a laser oscillation form, a pulse frequency, and a pulse duty cycle.

15. A laser processing apparatus comprising:

a laser oscillator constructed to output a laser beam;

a partial-reflection mirror coupled into a path of the laser beam;

a detector for detecting an absorptance of said partial reflection mirror;

a mode changeover unit disposed to change the laser beam from one beam mode to another beam mode in response to a changeover command; and a beam-mode control unit, coupled between said detector and said mode changeover unit, for outputting the changeover command to said mode changeover unit if the absorptance detected by said detector satisfies a predetermined condition.

16. A laser processing apparatus according to claim 15, wherein said beam-mode control unit compares the detected absorptance with internal mode changeover data, and, if the comparison yields a given result, outputs the changeover command to actuate said mode changeover unit.

17. A laser processing apparatus according to claim 15, further comprising a controller, operatively connected to said laser oscillator, for controlling said laser oscillator in accordance with one of a plurality of sets of stored processing conditions, whereby each of the sets of stored processing conditions is unique to one of the beam modes, respectively.

18. A laser processing apparatus according to claim 17, wherein the plurality of sets of stored processing conditions are stored in a data storage unit internal to said controller.

19. A laser processing apparatus according to claim 17, further comprising a processing table for fixing a workpiece to be processed in a path of the laser beam.

20. A laser processing apparatus according to claim 19, wherein the stored processing conditions are tailored to workpieces to be processed by said apparatus, and include parameters relating to at least any of a composition of the workpiece, a thickness of the workpiece, a processing speed for the workpiece, and a processing profile for the workpiece.

21. A laser processing apparatus according to claim 17, wherein the stored processing conditions are tailored to workpieces to be processed by said apparatus, and include setting values for at least any of a processing gas pressure, a nozzle height, a laser output level, a laser oscillation form, a pulse frequency, and a pulse duty cycle.

22. A laser processing apparatus comprising:

a laser oscillator constructed to output a laser beam;

a focusing optical element coupled into a path of the laser beam;

a detector for detecting an absorptance of said focusing optical element;

a mode changeover unit disposed to change the laser beam from one beam mode to another beam mode in response to a changeover command; and a beam-mode control unit, coupled between said detector and said mode changeover unit, for outputting the changeover command to said mode changeover unit if the absorptance detected by said detector satisfies a predetermined condition.

23. A laser processing apparatus according to claim 22, wherein said beam-mode control unit compares the detected absorptance with internal mode changeover data, and, if the comparison yields a given result, outputs the changeover command to actuate said mode changeover unit.

24. A laser processing apparatus according to claim 22, further comprising a controller, operatively connected to said laser oscillator and said focusing optical element, for controlling said laser oscillator and said focusing optical element in accordance with one of a plurality of sets of stored processing conditions, whereby each of the sets of stored processing conditions is unique to one of the beam modes, respectively.

25. A laser processing apparatus according to claim 24, wherein the plurality of sets of stored processing conditions are stored in a data storage unit internal to said controller.

26. A laser processing apparatus according to claim 24, further comprising a processing table for fixing a workpiece to be processed in a path of the laser beam.

27. A laser processing apparatus according to claim 26, wherein the stored processing conditions are tailored to workpieces to be processed by said apparatus, and include parameters relating to at least any of a composition of the workpiece, a thickness of the workpiece, a processing speed for the workpiece, and a processing profile for the workpiece.

28. A laser processing apparatus according to claim 24, wherein the stored processing conditions are tailored to workpieces to be processed by said apparatus, and include setting values for at least any of a focal position, a processing gas pressure, a nozzle height, a laser output level, a laser oscillation form, a pulse frequency, and a pulse duty cycle.

29. A laser processing apparatus comprising:

a laser oscillator constructed to output a laser beam;

an output detector for detecting a laser beam output level of said laser oscillator;

a partial-reflection mirror coupled into a path of the laser beam;

an absorptance detector for detecting an absorptance of said partial reflection mirror;

a mode changeover unit disposed to change the laser beam from one beam mode to another beam mode in response to a changeover command; and a beam-mode control unit, coupled to said output detector, said absorptance detector and said mode changeover unit, for outputting the changeover command to said mode changeover unit if the output level detected by said output detector and the absorptance detected by said absorptance detector satisfy predetermined conditions.

30. A laser processing apparatus comprising:

a laser oscillator constructed to output a laser beam;

an output detector for detecting a laser beam output level of said laser oscillator;

a focusing optical element coupled into a path of the laser beam;

an absorptance detector for detecting an absorptance of said focusing optical element;

a mode changeover unit disposed to change the laser beam from one beam mode to another beam mode in response to a changeover command; and a beam-mode control unit, coupled to said output detector, said absorptance detector and said mode changeover unit, for outputting the changeover command to said mode changeover unit if the output level detected by said output detector and the absorptance detected by said absorptance detector satisfy predetermined conditions.

31. A laser processing apparatus comprising:

a laser oscillator constructed to output a laser beam;

a partial-reflection mirror coupled into a path of the laser beam;

a first absorptance detector for detecting an absorptance of said partial reflection mirror;

a focusing optical element coupled into a path of the laser beam;

a second absorptance detector for detecting an absorptance of said focusing optical element;

a mode changeover unit disposed to change the laser beam from one beam mode to another beam mode in response to a changeover command; and a beam-mode control unit, coupled to said first absorptance detector, said second absorptance detector and said mode changeover unit, for outputting the changeover command to said mode changeover unit if the absorptance detected by said first absorptance detector and the absorptance detected by said second absorptance detector satisfy predetermined conditions.

* * * * *